(12) United States Patent
Raza

(10) Patent No.: US 7,934,057 B1
(45) Date of Patent: Apr. 26, 2011

(54) LOGIC FOR IMPLEMENTING A DUAL CLOCK DOMAIN READ ACCESS WITH PREDICTABLE TIMING FOR BI-DIRECTIONAL INPUTS/OUTPUTS

(75) Inventor: S. Babar Raza, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 329 days.

(21) Appl. No.: 10/746,349

(22) Filed: Dec. 24, 2003

(51) Int. Cl.
*G06F 13/00* (2006.01)

(52) U.S. Cl. ......... 711/131; 711/167; 711/168; 711/149

(58) Field of Classification Search .................. 711/131, 711/149, 167, 168
See application file for complete search history.

(56) References Cited

U.S. PATENT DOCUMENTS

| | | | |
|---|---|---|---|
| 4,899,352 A * | 2/1990 | Cucchi et al. | 375/372 |
| 4,965,794 A | 10/1990 | Smith | |
| 4,970,499 A | 11/1990 | Ryherd et al. | |
| 5,166,926 A | 11/1992 | Cisneros et al. | |
| 5,247,626 A | 9/1993 | Firoozmand | |
| 5,418,781 A | 5/1995 | Kaufman et al. | |
| 5,444,853 A | 8/1995 | Lentz | |
| 5,502,833 A | 3/1996 | Byrn et al. | |
| 5,586,294 A | 12/1996 | Goodwin et al. | |
| 5,625,625 A | 4/1997 | Oskouy et al. | |
| 5,638,506 A | 6/1997 | Peterson et al. | |
| 5,649,230 A | 7/1997 | Lentz | |
| 5,778,250 A * | 7/1998 | Dye | 712/32 |
| 5,802,546 A | 9/1998 | Chisholm et al. | |
| 5,804,986 A | 9/1998 | Jones | |
| 5,805,808 A | 9/1998 | Hasani et al. | |
| 5,812,820 A | 9/1998 | Loram | |
| 5,815,501 A | 9/1998 | Gaddis et al. | |
| 5,822,383 A | 10/1998 | Muntz et al. | |
| 5,822,776 A | 10/1998 | De Korte et al. | |
| 5,881,269 A | 3/1999 | Dobbelstein | |
| 5,898,687 A | 4/1999 | Harriman et al. | |
| 5,912,898 A | 6/1999 | Khoury | |
| 5,914,757 A | 6/1999 | Dean et al. | |
| 5,963,499 A | 10/1999 | Leong et al. | |
| 5,970,229 A | 10/1999 | Thomas et al. | |
| 5,991,295 A | 11/1999 | Tout et al. | |
| 6,005,795 A | 12/1999 | Hawkins et al. | |

(Continued)

FOREIGN PATENT DOCUMENTS

JP   01285088 A1   11/1989

(Continued)

OTHER PUBLICATIONS

USPTO Notice of Allowance for U.S. Appl. No. 09/676,171 dated Dec. 6, 2005; 4 pages.

(Continued)

*Primary Examiner* — Tuan V Thai
*Assistant Examiner* — Jae U Yu

(57) ABSTRACT

Embodiments of the invention are directed to systems and method for providing predictable timing for read operations in a multiport memory device. Accordingly, an embodiment is directed to a multiport memory system, comprising a single port memory core synchronized to a first clock, multiple access ports synchronized to at least a second clock, and a multiplexer logic coupled to the core memory and the plurality of access ports. The multiplexer logic arbitrates access to the memory core between multiple access ports. Each access ports includes an uncertainty detect logic that measures data path latency, and an uncertainty adjust logic that operates to selectively add data path delay to increase the measured path latency to a predictable value.

21 Claims, 8 Drawing Sheets

U.S. PATENT DOCUMENTS

| | | | |
|---|---|---|---|
| 6,005,796 | A | 12/1999 | Sywyk et al. |
| 6,047,339 | A | 4/2000 | Su et al. |
| 6,049,487 | A | 4/2000 | Plants et al. |
| 6,104,802 | A | 8/2000 | Perlmutter |
| 6,115,379 | A | 9/2000 | Flanders et al. |
| 6,131,123 | A | 10/2000 | Hurst et al. |
| 6,163,810 | A | 12/2000 | Bhagavath et al. |
| 6,163,842 | A | 12/2000 | Barton |
| 6,181,595 | B1 | 1/2001 | Hawkins et al. |
| 6,181,634 | B1 | 1/2001 | Okita |
| 6,212,597 | B1 | 4/2001 | Conlin et al. |
| 6,246,682 | B1 | 6/2001 | Roy et al. |
| 6,246,692 | B1 | 6/2001 | Dai et al. |
| 6,262,912 | B1 | 7/2001 | Sywyk et al. |
| 6,269,413 | B1 | 7/2001 | Sherlock |
| 6,292,877 | B1 | 9/2001 | Ryan |
| 6,295,295 | B1 | 9/2001 | Wicklund |
| 6,304,936 | B1 | 10/2001 | Sherlock |
| 6,339,596 | B1 | 1/2002 | Kozaki et al. |
| 6,363,077 | B1 | 3/2002 | Wong et al. |
| 6,425,045 | B2 | 7/2002 | LaBerge |
| 6,430,088 | B1 | 8/2002 | Plants et al. |
| 6,430,626 | B1 | 8/2002 | Witkowski et al. |
| 6,504,204 | B1 | 1/2003 | Hsu et al. |
| 6,515,991 | B1 | 2/2003 | McKeown |
| 6,545,935 | B1 | 4/2003 | Hsu et al. |
| 6,560,668 | B2 | 5/2003 | Ryan et al. |
| 6,578,118 | B1 | 6/2003 | Raza et al. |
| 6,581,144 | B1 | 6/2003 | Raza et al. |
| 6,631,455 | B1 | 10/2003 | Raza et al. |
| 6,731,566 | B1 | 5/2004 | Sywyk et al. |
| 6,760,327 | B1 | 7/2004 | Manchester et al. |
| 6,816,955 | B1 | 11/2004 | Raza et al. |
| 6,822,960 | B1 | 11/2004 | Manchester et al. |
| 6,834,378 | B2 * | 12/2004 | Augsburg et al. ............... 716/6 |
| 6,907,479 | B2 | 6/2005 | Karnstedt et al. |
| 6,934,289 | B2 | 8/2005 | Lee |
| 7,016,349 | B1 | 3/2006 | Raza et al. |
| 7,193,994 | B1 | 3/2007 | Payson |
| 7,242,686 | B1 | 7/2007 | Dougherty et al. |
| 7,289,946 | B1 * | 10/2007 | Lee ............... 703/16 |
| 2001/0014053 | A1 * | 8/2001 | Li ............... 365/230.05 |
| 2001/0044882 | A1 * | 11/2001 | Pille et al. ............... 711/149 |
| 2002/0010897 | A1 * | 1/2002 | Stark ............... 716/1 |
| 2002/0057893 | A1 | 5/2002 | Wood et al. |
| 2002/0091916 | A1 | 7/2002 | Dowling |
| 2002/0188816 | A1 * | 12/2002 | Johnson et al. ............... 711/167 |
| 2004/0039938 | A1 * | 2/2004 | Katz et al. ............... 713/201 |
| 2004/0088439 | A1 * | 5/2004 | Lee et al. ............... 709/250 |

FOREIGN PATENT DOCUMENTS

| | | | |
|---|---|---|---|
| WO | WO2004075447 | A1 | 2/2004 |
| WO | WO2004/075447 | * | 9/2004 |

OTHER PUBLICATIONS

USPTO Non-Final Rejection for U.S. Appl. No. 09/676,171 dated Jun. 18, 2002; 16 pages.

Julie K. Peterson, "The Telecommunications Illustrated Dictionary," Second Edition, 2002, CRC Press; 3 pages.

USPTO Notice of Allowance for U.S. Appl. No. 09/676,170 dated Dec. 3, 2002; 5 pages.

USPTO Non-Final Rejection for U.S. Appl. No. 09/676,170 dated Aug. 15, 2002; 25 pages.

USPTO Notice of Allowance for U.S. Appl. No. 09/676,705 dated May 2, 2003; 5 pages.

USPTO Non-Final Rejection for U.S. Appl. No. 09/676,705 dated Nov. 13, 2002; 65 pages.

"Algorithm for Managing Multiple First-In, First-Out Queues from a Single Shared Random-Access Memory," IBM Technical Disclosure Bulletin, Aug. 1989; 5 pages.

USPTO Notice of Allowance for U.S. Appl. No. 09/676,169 dated Jul. 14, 2004; 4 pages.

USPTO Advisory Action for U.S. Appl. No. 09/676,169 dated Jan. 15, 2004; 1 page.

USPTO Advisory Action for U.S. Appl. No. 09/676,169 dated Dec. 11, 2003; 2 pages.

USPTO Final Rejection for U.S. Appl. No. 09/676,169 dated Sep. 24, 2003; 8 pages.

USPTO Non-Final Rejection for U.S. Appl. No. 091676,169 dated Jun. 4, 2003; 7 pages.

USPTO Advisory Action for U.S. Appl. No. 09/676,169 dated Mar. 6, 2003; 5 pages.

USPTO Final Rejection for U.S. Appl. No. 09/676,169 dated Dec. 18, 2002; 10 pages.

USPTO Non-Final Rejectors for U.S. Appl. No. 09/676,169 dated Jul. 25, 2002; 6 pages.

"A Comprehensive Dictionary of Electrical Engineering," Editor-in-Chief: Phillip A, Laplante; 1999, CRC Press; 3 pages.

Merriam Webster Online Dictionary "Separate;" retrieved on Feb. 10, 2004; 1 page.

USPTO Notice of Allowance for U.S. Appl. No. 09/676,704 dated Mar. 9, 2005; 8 pages.

USPTO Reply Brief Noted by Examiner for U.S. Appl. No. 09/676,704 dated Dec. 23, 2003; 2 pages.

USPTO Advisory Action for U.S. Appl. No. 09/676,704 dated Jul. 25, 2003; 1 page.

USPTO Advisory Action for U.S. Appl. No. 09/676,704 dated Jun. 13, 2003; 2 pages.

USPTO Final Rejection for U.S. Appl. No. 09/676,704 dated Apr. 14, 2003; 9 pages.

USPTO Non-Final Rejection for U.S. Appl. No. 09/676,704 dated Nov. 5, 2002; 6 pages.

USPTO Notice of Allowance for U.S. Appl. No. 10/773,948 dated Jun. 26, 2009; 6 pages.

USPTO Notice of Allowance for U.S. Appl. No. 10/773,948 dated Feb. 25, 2009; 6 pages.

USPT Notice of Allowance for U.S. Appl. No. 10/773,948 dated Sep. 22, 2008; 7 pages.

USPTO Notice of Allowance for U.S. Appl. No. 10/773,948 dated Jul. 23, 2008; 8 pages.

USPTO Non-Final Rejection for U.S. Appl. No. 10/773,948 dated Jan. 14, 2008; 7 pages.

USPTO Non-Final Rejection for U.S. Appl. No. 10/773,948 dated Jul. 31, 2007; 7 pages.

U.S. Appl. No. 60/445,872: "Logic for Implementing a Dual Clock Domain Read Access with Predictable timing for Bi-Directional Inputs/Outputs;" Raza; 6 pages.

U.S. Appl. No. 60/437,303: "Dual-Port Memory Using a Single Port Memory for Multiple Clock Domain;" Raza; 9 pages, USPTO Notice of Allowance for U.S. Appl. No. 09/676,706 dated Oct. 19, 2005; 6 pages.

USPTO Advisory Action for U.S. Appl. No. 09/676,706 dated Aug. 10, 2005; 2 pages.

USPTO Final Rejection for U.S. Appl. No. 09/676,706 dated Jun. 1, 2005; 7 pages.

USPTO Non-Final Rejection for U.S. Appl. No. 09/676,706 dated Sep. 22, 2004; 7 pages.

S. Babar Raza et al., "Architecture for Implementing Virtual Multiqueue Fifos;" U.S. Appl. No. 09/676,704, filed Sep. 29, 2000; 79 pages.

S. Babar Raza et al., "Logic for Providing Arbitration for Synchronous Dual-Port Memory," U.S. Appl. No. 09/676,169, filed Sep. 29, 2000; 82 pages.

S. Babar Raze et al., "Logic for Initializing the Depth of the Queue Pointer Memory;" U.S. Appl. No. 09/676,705, filed Sep. 29, 2000; 82 pages.

S. Babar Raza et al., "Method and Logic for Initializing the Forward-Pointer Memory During Normal Operation of the Device as a Background Process;" U.S. Appl. No. 09/676,170, filed Sep. 29, 2000; 82 pages.

S. Babar Raze et al., "Method for Logic for Storing and Extracting in-Band Multicast Port Information Stored along with the Data in a Single Memory without Memory Read Cycle Overhead;" U.S. Appl. No. 09/676,171, filed Sep. 29, 2000; 83 pages.

S. Babar Raza et al., "Logic for Generating Multicast/Unicast Address(es);" U.S. Appl. No. 09/676,706, filed Sep. 29, 2000; 83 pages.

* cited by examiner

LOGIC FOR IMPLEMENTING A DUAL CLOCK DOMAIN READ ACCESS WITH PREDICTABLE TIMING FOR BI-DIRECTIONAL INPUTS/OUTPUTS

RELATED APPLICATIONS

The present application is related to and claims priority from and herein incorporates by reference the U.S. provisional patent application Ser. No. 60/445,872, entitled "Dual-port memory using a single port memory for multiple clock domain", by inventor, Raza S. BABAR, filed on Feb. 7, 2003, and U.S. provisional patent application Ser. No. 60/437,303, entitled "A logic for implementing a dual clock domain read access with predictable timing for bi-directional I/Os", by the same inventor, filed on Dec. 31, 2002.

FIELD OF INVENTION

The present disclosure generally relates to computer memory systems.

BACKGROUND ART

Random Access Memory cells or RAM cells have become increasingly popular due in part to the attractive costs of these devices. Many such conventional RAM cells are ordinarily only addressable from a single port. In such a memory apparatus, the input of an address causes a single select line or a coincidence of two select lines, such as a row select line and a column select line, to cause the addressed cell to be selected. Upon selection of a cell, data may then be sensed from or written into the selected storage cell on one or two bit sense lines. Alternatively, in some RAM cells, a single selection line causes the particular cell to be selected, and other selection circuitry activated by the same address causes the bit-sense lines to be selected. However, there are never any options for reading and writing at the same time. The same selection lines and the same bit sense lines are always utilized to access and write or read the content of a particular location. Consequently, a single port RAM memory device cannot be simultaneously addressed and accessed from separate sources.

Certain applications require higher memory access speeds. Examples of such high speed applications may be graphic related memory systems such as those used in a computer display systems, data transfer and buffering devices used in high speed communication systems, and memory systems used in conjunction with arithmetic logic units. For such applications, multiport random access memory devices have been developed to provide increased accessibility to the memory contents of the random access memory unit and more flexibility for inter-processor communications. One example of a multi-port memory device is a dual-port RAM cell accessible simultaneously by two independent entities. In digital integrated circuits (ICs), this implies a dual-port memory cell that can be accessed at the same time through two different ports. Each port utilizes independent sets of addresses and control lines to access the memory array.

FIG. 1 shows a block diagram of an implementation of a conventional dual-ported memory system 100. As shown in FIG. 1, this implementation of a dual ported memory cell supports multiple clock domains. A true dual port memory system provides simultaneous access to any location in the memory, wherein either port can be used to read or write data into and out of any memory location at the same time. Additionally, some dual port memory systems include the ability to run each port on an independent clock domain, enabling the processing of large amounts of data very efficiently and quickly. Independent clock domains also enable communication between multiple processors and solves the rate-mismatch problem caused by processors operating at different speeds.

Although the conventional dual port memory system 100 of FIG. 1 provides for an effective solution for operations requiring high memory access speeds, it may result in a large circuit design and relatively high development costs. For the same density, a dual port memory is approximately twice the size of a single port memory. Additionally, for each new generation of fabrication process technology, a new dual port cell must be designed and tested, leading to additional development expenses.

FIG. 2 shows a block diagram of a second conventional implementation of a dual ported memory device 200. As shown in FIG. 2, a single ported memory 202 is used for data that is communicated across clock boundaries. In this system, data crosses the clock domain boundary 204 through a first in first out (FIFO) memory 206. The data is synchronized to the second clock domain 208 through this FIFO 206. This method of data transfer is used for sequential data processing and is unidirectional. As shown in FIG. 2, the address for the data is generated in the second clock domain and does not cross the clock boundary 204. The memory system 200 is more size efficient than the dual port memory system 100 of FIG. 1. However, the memory system of FIG. 2 is most suitable for unidirectional and sequential data flow only. The dual port memory system 200 is not well adapted to handling bi-directional input and output access to the memory device. Furthermore, whenever a system runs on or is synchronized to more than one clock, a degree of uncertainty is inherent in the system.

SUMMARY OF THE INVENTION

Therefore, systems and methods are desired that provide predictable timing for bi-directional access in multi-clock domain memory devices providing high data transfer rates required of the traditional multiport RAMs, without the disadvantages of large circuits size, high development cost, and other limitations inherent in memory systems such the ones shown in FIGS. 1 and 2.

Accordingly, embodiments of the invention are directed to a system and method for providing predictable timing for read operation from a multiport memory device operating over multiple clock domains. An embodiment of the system of the present invention is directed to a multiport memory system comprising a single port memory core synchronized to a first clock, a first multiplexer logic coupled to the core memory and a plurality of access ports, where the multiplexer logic operates as an arbitrator between the plurality of access ports attempting to access the core memory.

Each access ports includes an uncertainty detect logic that measures data path latency, and an uncertainty adjust logic that operates to selectively add data path delay to increase the measured path latency to a predictable value.

An embodiment of a method according to the present invention provides predictable timing for read access in a dual clock domain, bi-directional input/output (I/O) device. The method comprises generating a tag, sending the generated tag through a data path crossing a clock domain, determining clock path latency based on a data path travel time of the generated tag, and adding at least one pipeline stage to the data path to increase the path latency up to a predictable time.

In one embodiment, the present invention consists of two main blocks, the uncertainty detect logic and the uncertainty adjust logic. The uncertainty detect logic sends a tag information to the other clock domain. It then waits until it receives the tag back. Based on the number of clock cycles it takes the tag to go through the FIFO paths in the two directions, it adjusts the pipelining stages.

The logic detect can be a counter, which counts the number of cycles the tag takes through the FIFO. It then provides that information to the select logic. The select logic then selects the multiplexer for the appropriate pipeline delays.

BRIEF DESCRIPTION OF THE DRAWINGS

The accompanying drawings, which are incorporated in and form a part of this specification, illustrate embodiments of the present invention, and together with the description, serve to explain the principles of the invention. Unless noted, the drawings referred to this description should be understood as not being drawn to scale.

DETAILED DESCRIPTION OF THE INVENTION

The present invention provides new systems and methods for bi-directional inputs and outputs (I/Os) access to the content of multiport memory devices operating over multi clock domains by providing predictable timing for device access.

In a typical dual port memory operation, after sending a read request, there is a predictable time (number of clock cycles) after which the data is guaranteed to arrive. However, when the signals cross the clock boundaries for synchronization, clock cycle uncertainty is introduced. This clock cycle uncertainty results in an unpredictable time after which the data can be guaranteed. Over time, the clock signals move with respect to each other. This movement of the clock cycles can cause the potential proximity of the two clock signal edges. As a result, the read or write control signals may not be processed in the current clock cycle, and data read from the memory core may not be available over the current clock cycle.

Figure 1:
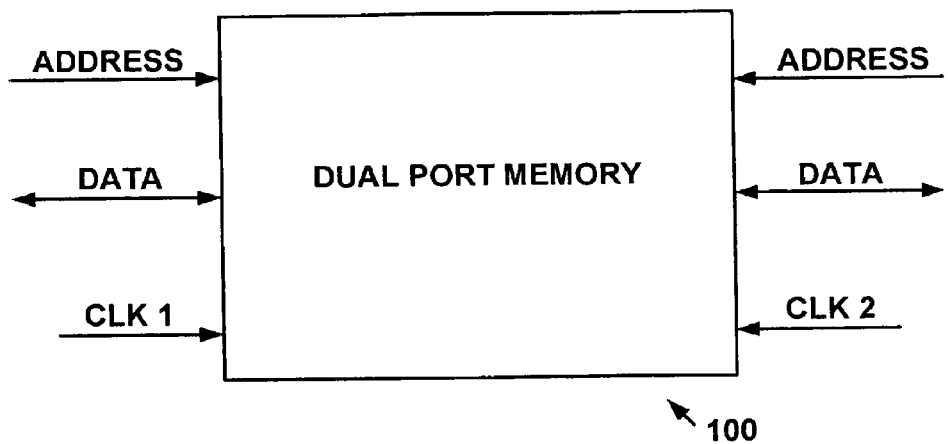
FIG. 1 shows a block diagram of an implementation of a conventional dual-ported memory system.
Figure 2:
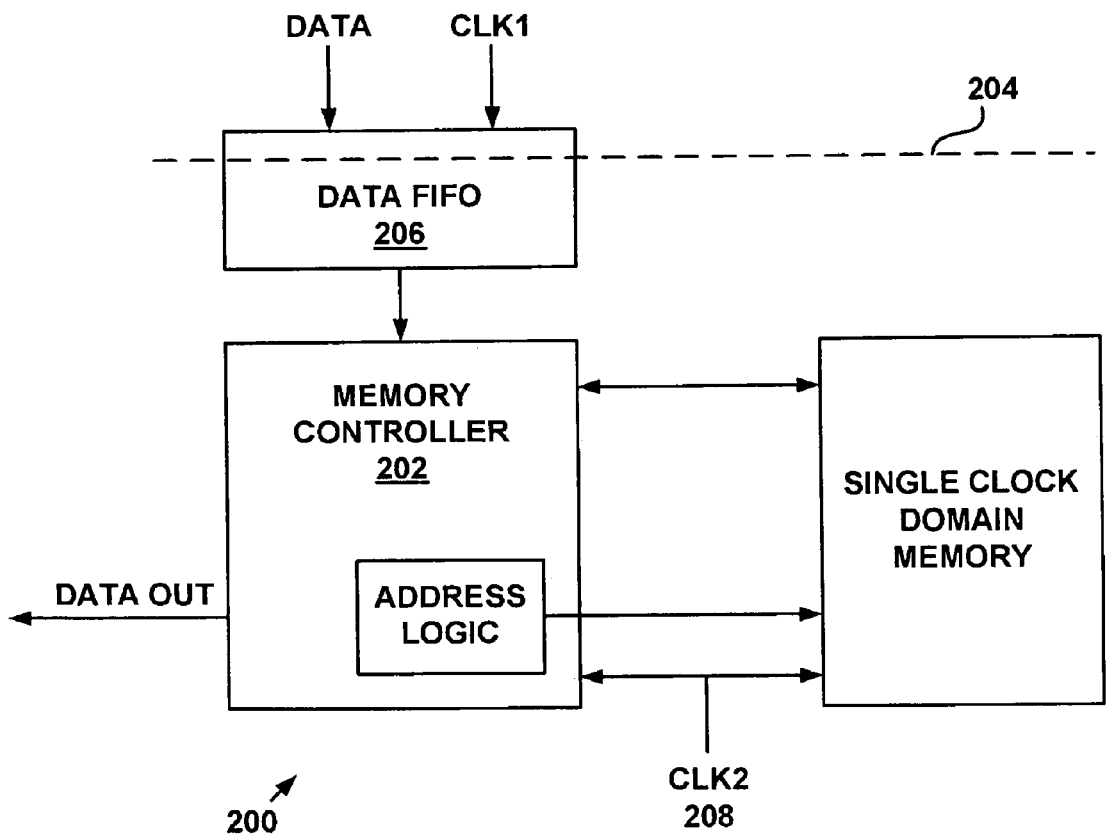
FIG. 2 shows a block diagram of a second conventional implementation of a dual ported memory device.
Figure 3:
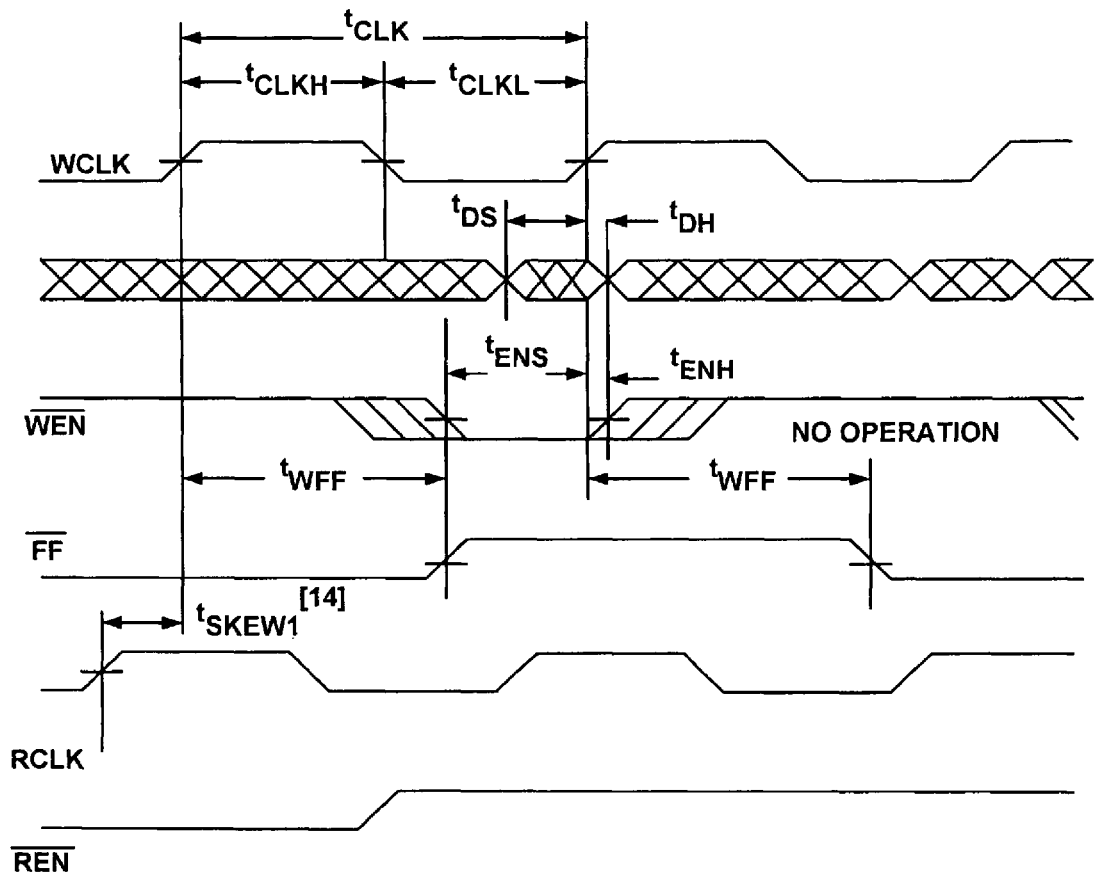
FIG. 3 shows a timing diagram of one embodiment of a multiport memory where FIFOs are used for synchronization of clock cycle, according to one embodiment of the present invention.
Figure 3:
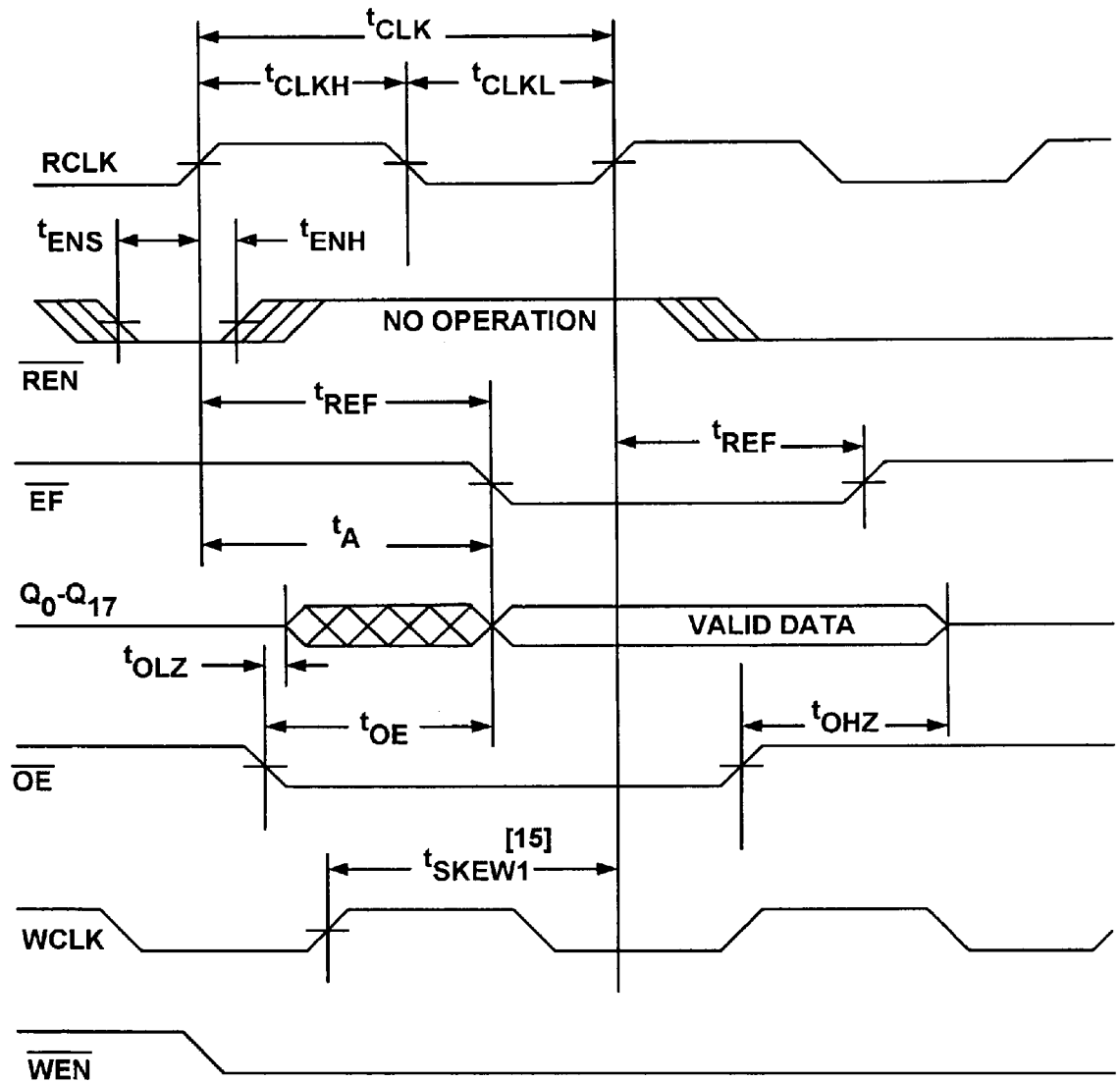

FIG. 3 shows a timing diagram of one embodiment of a multiport memory where FIFOs are used for synchronization of clock cycle, according to one embodiment of the present invention. In order to provide access to a port from a single clock domain core, the port, the data and the control signals have to be synchronized from the port clock logic to the core clock logic. In one embodiment of the present invention, this synchronization can be achieved through FIFOs. As previously discussed, when the signals cross the clock boundaries for synchronization, it introduces clock cycle uncertainty. In one embodiment, FIFO's may be used for synchronization of signals crossing clock domains. As shown in the timing diagram of FIG. 3, the memory core logic may operate on the empty (EFB). In a read operation, when the EFB flag is asserted, the core logic detects that there is a request for a read. The assertion of this flag can be in the same clock cycle as shown in the timing waveform, or in the next cycle if the separation of the read clock from the write clock is less than $t_{SKEW1}$, parameter. $t_{SKEW1}$, is the minimum time between a rising write clock (RCLK) edge and a rising read clock (WCLK) edge to guarantee that EFB or (EF) will be asserted during the clock cycle. If the time between the rising edge of WCLK and the rising edge of RCLK is less than $t_{SKEW1}$, then EFB may not change state until the next RCLK rising edge.

Figure 3A:
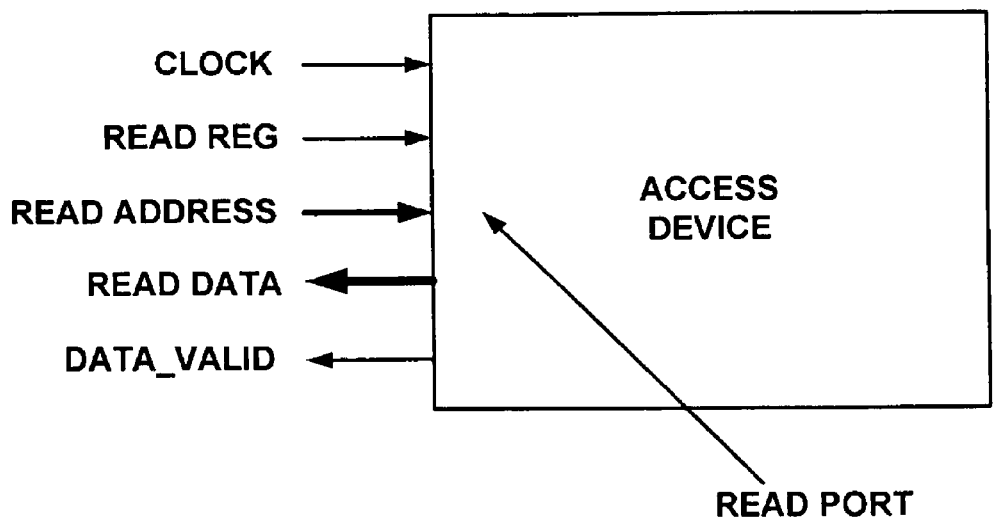
FIG. 3A shows an example of an access port using a data_valid pin, according to one embodiment of the present invention.

In one embodiment of the present invention, the solution to the unpredictable read access timing issue may be based on the use of a data_valid pin. FIG. 3A shows an example of an access port using a data_valid pin, according to one embodiment of the present invention. Accordingly, in a read operation, the response to a read request (read data) is accompanied with an additional pin providing a data_valid signal that gives an indication of whether or not the data to be read from the memory is valid and/or available on the current clock cycle.

Although the use of a data_valid signal may resolve some of the problems due to clock uncertainty, it requires an additional pin to indicate the availability of the data. The additional pin results in a dual port memory device having a pin structure different from that of a conventional dual port memory device.

Figure 4:
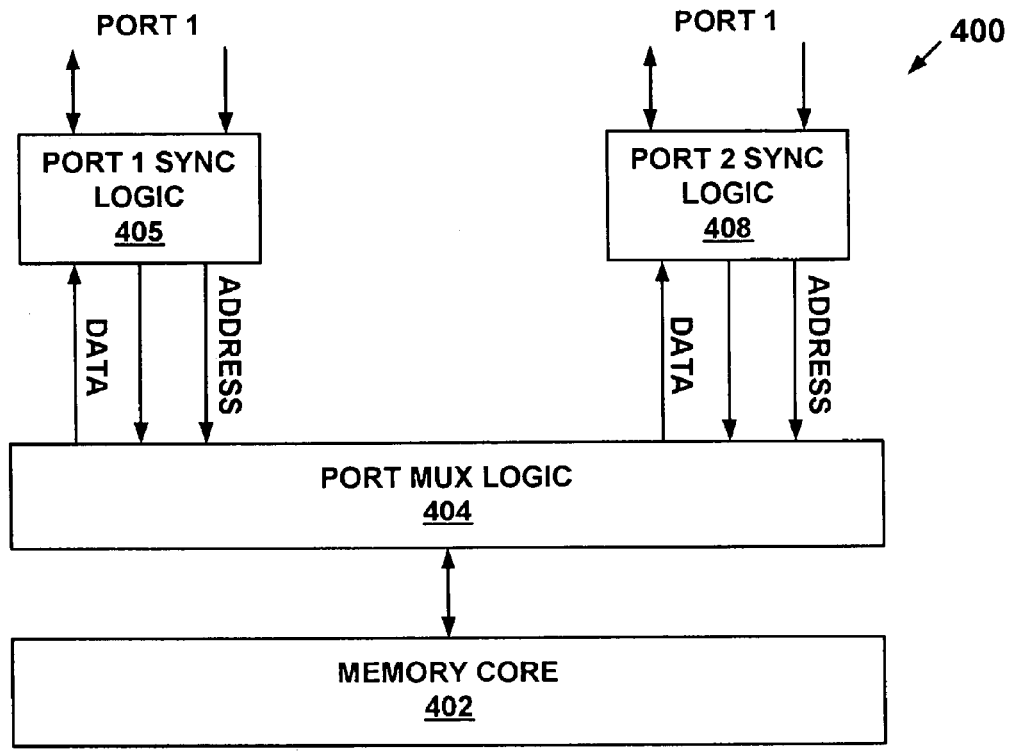
FIG. 4 shows a block diagram of a dual port memory system, according to another embodiment of the present invention.

FIG. 4 shows a block diagram of the dual port memory system, according to another embodiment of the present invention. As shown in FIG. 4, a single port memory device 400 operating over multiple clock domains is used to allow random access, bi-directional data flow in and out of a memory device. The new dual port memory system 400 includes access port 1 and access port 2, used in communicating with a single memory core 402 through a port multiplexer (MUX) logic 404. Access to the core memory 402 through each of the access ports 1 and 2 is via port sync logic (or sub-systems) 406 and 408 respectively. The new dual port memory system 400 is further described in the related US provisional patent application serial number 60,445,872, entitled "Dual-port memory using a single port memory for multiple clock domain", by inventor, Raza S. BABAR, filed on Feb. 5, 2003, and incorporated herein by reference.

As shown in FIG. 4, in one embodiment of the present invention, the memory core 402 is a single port memory core. The port multiplexer logic block 404 controls the access to the memory core 402. The port multiplexer logic block 404 acts as a time division multiplexer (TDM) and for data and addresses coming from each of the access ports 406 and 408. In one embodiment of the present invention, the bandwidth between the port multiplexing logic block 404 and the memory core 402 is at least the twice the larger bandwidth between access ports 406 or 408 and the multiplexer 404. The port multiplex logic 404 may arbitrate access to the memory core 402 among the multiple access ports 406, 408, etc.

The operation of the port sync logic 406 and port sync logic 408 are transparent to any outside devices. The dual port memory device 400 implemented according to an embodiment of the present invention allows concurrent writes on each port, concurrent reads on each port and simultaneous read and write operation on each port in multiple clock domains.

Figure 5:
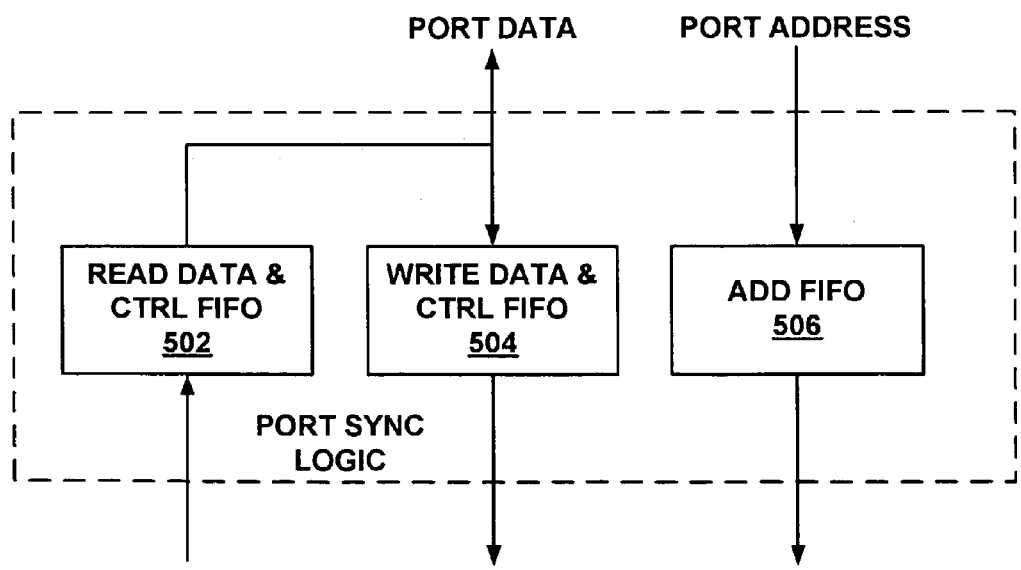
FIG. 5 shows a detailed block diagram of a port synchronization logic sub-system according to an embodiment of the present invention.

FIG. 5 shows a detailed block diagram of a port synchronization logic sub-system 406 and 408 according to an embodiment of the present invention. In one embodiment of the present invention, the port synchronization logic subsystem 500 includes a read data and control First In First Out (FIFO) 502, a write data and control FIFO 504 and a port address FIFO 506. Data from the memory core 402 (FIG. 4) flows through the port MUX logic 404 (FIG. 4) and through the read data control FIFO 502 during a read operation. Similarly, data to be written to the memory core 402 flows from the write data control FIFO 504, through the port MUX logic 404 to the memory core 402. Each read operation has a corresponding address that is provided to the memory core 402, through the port MUX logic 404. The address FIFO 506 is for the write or read address.

In operation, the FIFOs are used to synchronize the signals crossing a clock boundary. For example, in the case of a write operation, data, address, and the write control signal are written from an access port synchronized to a first clock, into the write data and control FIFO 504. Thus, the incoming data and control signals are synchronized to the port sync logic's clock. The write data and control signal are then synchronized to the core memory's 402 clock through the write data and control FIFO 504.

In one embodiment, each FIFO may be implemented using a memory. In an alternative embodiment, the FIFO function may be implemented using synchronizing registers. It should be apparent to one skilled in the art that alternative implementations of the present invention may use other means of synchronizing the signals crossing a clock boundary.

The read or write operations are performed and the outgoing data and control signals are passed to the read FIFO 502. In a read operation, the incoming read control signal is first synchronized from the port clock cycle to the core using the write data and control FIFO 504. Next, the read control signal is processed with respect to the core memory 402 clock. Once the read access operation is performed, the outgoing data and control signals are passed to the read FIFO 502 and synchronized to the port clock domain using the read FIFO 502.

In one embodiment, if the port uses the same clock as the core, the FIFOs can then be bypassed. This ability to by-pass the FIFOs allows for reduced latency for that particular port.

The operation of the port sync logic 406 and port sync logic 408 may be transparent to any outside devices. Therefore, the dual port memory device 400 implemented according to an embodiment of the present invention operates to allow concurrent writes on each port, concurrent reads on each port and simultaneous read and write operation from each port in multiple clock domains. However, in the exemplary embodiment of the present invention presented herein above, when a read, write, control or address signal crosses a clock boundary, uncertainty is introduced into the system. Whenever a system runs on or is synchronized to more than one clock, a degree of uncertainty is inherent in the system. The clock uncertainty is introduced when the two clocks are very close to each other. As a result, signals may not be registered or evaluated in time, causing a delay in the response by at least one clock cycle. Thus, whenever a signal crosses the clock boundaries, some uncertainty may be introduced due to the possibility that a clock cycle may be lost because of the potential close proximity of the signal to the clock edges.

In a conventional dual port memory operation, after sending a read request, there is a predictable time (number of clock cycles) after which the data is guaranteed to arrive. In certain embodiment of the present invention, for example, the write clock which the write request is based on may be slightly behind the read clock (e.g. see FIG. 3). In that case, processing of the read request may be delayed because of the closeness of the two clock edges. However, when signals cross clock boundaries and in the presence of clock cycle uncertainty, the time after which the data is guaranteed to be available is unpredictable.

As previously mentioned, a data_valid pin may be added to indicate whether the data is valid or not in the current clock cycle. However, in order to maintain the traditional dual port memory device design, a new solution to overcome read access clock uncertainty in a multiport memory device operating over multiple clock domains is desired.

Figure 6:
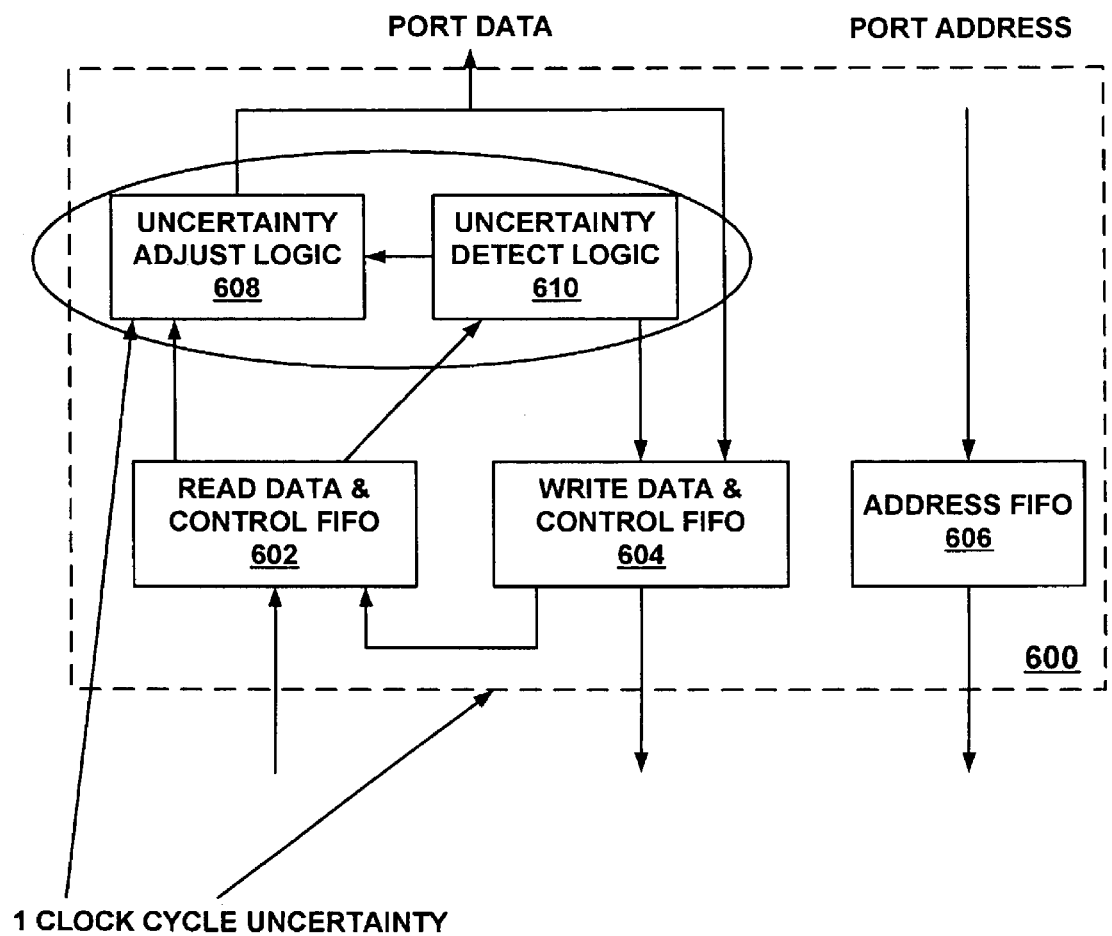
FIG. 6 shows an implementation of the port synchronization logic architecture according to an embodiment of the present invention.

FIG. 6 shows an implementation of the port sync logic architecture according to one embodiment of the present invention. As shown in FIG. 6 and similarly to the embodiment of FIG. 5, the port synchronization logic 600 includes a read data and control FIFO 602, a write data and control FIFO 604, and an address FIFO 606. Additionally, the port synchronization logic 600 includes an uncertainty detect logic 610 and an uncertainty adjust logic 608. In one embodiment of the present invention, the data read from the core memory 402 (FIG. 4) passes through the read data and control FIFO 602, as well as the uncertainty adjust logic 608 before being available at the port. To an outside device, the operations of the uncertainty adjust logic 608 and uncertainty detect logic 610 are transparent.

Figure 7:
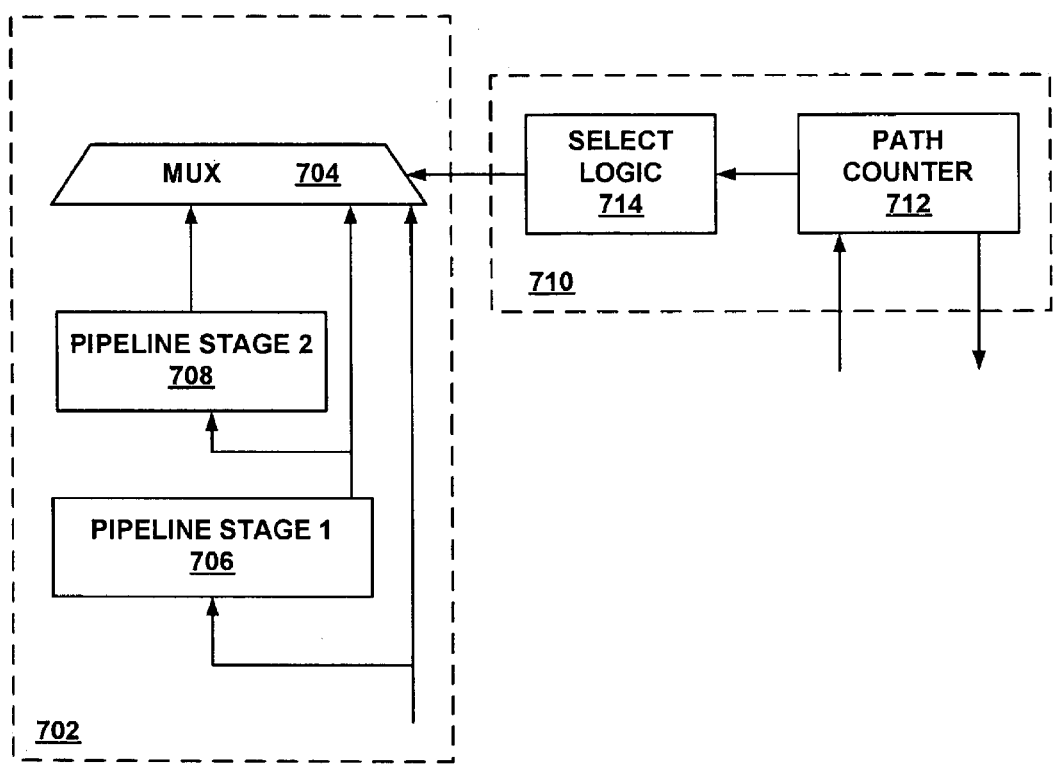
FIG. 7 shows the uncertainty adjust logic and the uncertainty detect logic, according to an embodiment of the present invention.

FIG. 7 shows the uncertainty adjust logic and the uncertainty detect logic, according to an embodiment of the present invention. As shown in FIG. 7, in one embodiment of the present invention, the uncertainty adjust logic sub-system 702 comprises a multiplexer (MUX) 704, and at least a first pipeline stage 706. In alternative embodiments, additional pipeline stages such as pipeline stage-2 708 are included as part of the uncertainty adjust logic sub-system 702.

According to an embodiment of the present invention, the uncertainty detect logic 710 includes a path counter 712 and a select logic block 714. In an alternative embodiment, a tag or control character generator may be used to generate a tag, control character or other types of unique identifier that is distinguishable from data.

In operation, the uncertainty detect logic 710 generates and sends a tag information across the multiple clock domains. In one embodiment, a tag or an otherwise recognizable character is generated by the path counter 712 or a control or tag generator and transmitted over the data path crossing the multiple clock domains. By measuring the travel time of the generated tag over the data path using the path counter 712 (also referred to as the counter), the path latency may be periodically calculated. In another embodiment, the measurement of the path latency may done in a continuous way by sending the tag along with each request and measuring its corresponding travel time. Thus, the path latency is calculated by sending the generated tag through the write data and control FIFO 604 (FIG. 6), across to the other clock domain (the core memory clock domain), and receiving back the generated tag through the read data and control FIFO 602 (FIG. 6). The path counter 712 determines the path latency by counting or measuring the travel time of the generated tag through the path, in terms of numbers of clock cycles. In an alternative embodiment, if the core clock is the same as the port clocks, the travel path for the generated tag bypasses the write data and control FIFO 604 and the read data and control FIFO 602.

The path latency results calculated by the path counter 712 is input to the select logic 714. The select logic 714 in turn controls the MUX 704. The MUX 704 controls the number of pipeline stages in the output path. Thus, the MUX 704 operates to adjust or select the appropriate pipeline stage to introduce the necessary added delay required for providing a predictable data access or read time. Based on the calculation of the path latency by the uncertainty detect logic 710, the uncertainty adjust logic 702 adjusts the path latency by adding pipelining stages that lengthen the travel time of the tag through the path and introduce additional delay in the travel path for the signal. For example, if the maximum path latency is 5 clock cycles and the generated tag travels the path in 4 clock cycles, the uncertainty adjust logic 702 adds 1 pipelining stage to the total path length in order to provide a 5 cycle latency. If the path latency is 5 cycles, no additional delay is introduced in the path.

Therefore, the uncertainty detect logic counts and compares the number of cycles or path latency and accordingly it adjusts the select logic by introducing appropriate amount of delay in the system which is performed by controlling multiplexer 704.

It should be apparent to one skilled in the art that alternative implementations of the present invention may combine the uncertainty detect logic and the uncertainty adjust logic into a single unit. Additionally, the functionalities of the path counter 712, the select logic 714, the MUX 704, etc, may be implemented by alternative devices with equivalent functionality. For example, each of the pipeline stages 708 or 706 may be implemented using a latch, a register or a memory. In one embodiment, the select logic 714 may be implemented using a comparator.

Figure 8:
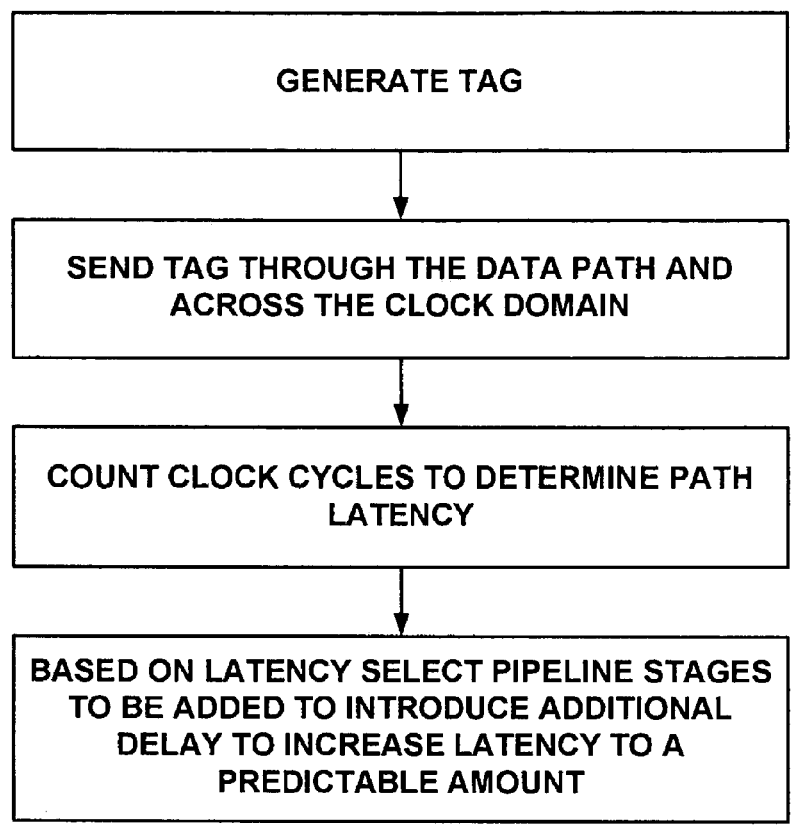
FIG. 8 is a flow chart of a process of implementing predictable read access timing according to an embodiment of the present invention.

FIG. 8 is a flow chart of a process of implementing predictable read access timing according to one embodiment of the present invention. As shown in FIG. 8, in operation 802 a tag or otherwise identifiable character is generated. In operation 804, the generated tag is sent through the path the data requested data travels in response to a read request. The path includes crossing the clock boundary and going through the read data and control FIFO 602 (FIG. 6) and write data and control FIFO 604.

In operation 806, the path latency is calculated in terms of number of clock cycles by counting the number of clock cycles it took for the generated tag to travel through the data path.

In operation 808, based on the measured path latency, additional delay is introduced into the data path if needed by selecting additional pipeline stages to be added to the path of the data. The added delay time provides a predictable read time. If the separation between the rising clock edges of the two clocks (WCLK and RCLK, see FIG. 3) is greater than a minimum ($t_{SKEW1}$, see FIG. 3) in both directions, it insures that additional clock cycle latency does not occur in either direction. Thus, the tag will return to the port logic in the minimum number of cycles. In case the separation between either of the two clocks edges is less than a minimum ($t_{SKEW1}$), there may be additional clock cycle latency that may have to be introduced. In the case where the clock edge separation is less than the minimum ($t_{SKEW1}$) in both directions, there may be additional latency in both directions. However, if the $t_{SKEW1}$ parameter is much smaller than the port clock period, the additional latency may occur in only one direction. In this case, introduction of additional latency through a second pipeline stage 708 (see FIG. 7).

It would be apparent to one skilled in the art that the systems and methods disclosed in the present invention are equally applicable to multiport memory devices operating over multiple clock domains.

The teachings of the various embodiments of the present invention provide predictable timing for bidirectional I/Os from a multiport memory device. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A multiport memory system comprising:
a memory core synchronized to a first clock;
a plurality of access ports synchronized to at least a second clock, each access port comprising:
an input path and an output path;
an uncertainty detect logic operable to measure data path latency associated with a data path, said data path extending within said memory core; and
an uncertainty adjust logic operable to selectively add data path delay based upon said data path latency measured by said uncertainty detect logic; and
a first multiplexer logic coupled between said memory core and said plurality of access ports, said multiplexer logic operable to arbitrate access to said core memory among said plurality of access ports, said multiplexer logic further for providing data from said memory core to at least one of said plurality of access ports, and said multiplexer logic further for providing data from at least one of said plurality of access ports to said memory core.

2. The system of claim 1 wherein said uncertainty detect logic further comprises:
a path counter operative to measure data path latency by counting numbers of clock cycles necessary for a tag to travel said data path; and
a select logic coupled to said path counter and operative to receive a data path latency measurement from said path counter and output a control signal to said uncertainty adjust logic.

3. The system of claim 2 wherein said data path traveled by said tag crosses domains of said first clock and said at least second clock.

4. The system of claim 2 further comprising:
a tag generator coupled to said path counter and operative to generate an identifiable control tag used in path latency measurements.

5. The system of claim 4 wherein said select logic further comprises:
a comparator for comparing said data path latency measured by said uncertainty detect logic to a desired path latency.

6. The system of claim 5 wherein said output of said select logic is based on said comparison of said data path latency measured by said uncertainty detect logic to said desired path latency.

7. The system of claim 6 wherein introduction of additional delay in said data path to raise said data path latency to said desired path latency is based on said output of said select logic.

8. The system of claim 1 wherein no delay is introduced by said uncertainty adjust logic.

9. The system of claim 1 wherein said data path delay has a duration of one clock cycle.

10. The system of claim 1 wherein said data path delay has a duration of two clock cycle.

11. The system of claim 1 wherein said uncertainty adjust logic further comprises:
a pipeline stage operative to introduce delay in said data path;
a second multiplexer with an input coupled to and controlled by an output of said uncertainty detect logic, said multiplexer operative to select said pipeline stage based on said input from said uncertainty detect logic.

12. The system of claim 11 wherein said output from said uncertainty detect logic is an output from a select logic device within said uncertainty detect logic, wherein a path counter within said uncertainty detect logic measures a path latency and inputs said path latency measurement to said select logic device, and wherein said select logic provides said output to said second multiplexer, said output used by said second multiplexer to select said pipeline stage.

13. A port synchronization device comprising:
a read and control FIFO coupled to a data path and operable to pass data from a first clock domain to a second clock domain;
a write and control FIFO coupled to said data path and operable to pass data from said second clock domain to said first clock domain;
an uncertainty detect and adjust logic coupled to said read and control FIFO and said write and control FIFO, said uncertainty detect and adjust logic operable to measure a path latency and adjust said path latency, wherein said uncertainty detect and adjust logic is further operable to measure said path latency by sending a tag through said write and control FIFO and receiving said tag through said read and control FIFO, wherein the uncertainty detect and adjust logic further comprises a pipeline stage, and wherein the uncertainty detect and adjust logic is configured to selectively add path delay based upon the path latency measured by the uncertainty detect and adjust logic; and
a multiplexer coupled with the pipeline stage, wherein the multiplexer is configured to select the pipeline stage from a plurality of pipeline stages.

14. The device of claim 13 wherein the pipeline stage is coupled to said data path and is configured to introduce increase path latency based on input from said uncertainty detect and adjust logic.

15. The device of claim 13 wherein said uncertainty detect and adjust logic further comprises:
a path counter for measuring said data path latency.

16. The device of claim 15 wherein said uncertainty detect and adjust logic further comprises:
a select logic coupled to said path counter, said select logic operative to select through its output said pipeline stage based on path latency measurement.

17. The device of claim 16 wherein the multiplexer is configured to select said pipeline stage based on input from said select logic.

18. A method for implementing a dual clock domain read access with predictable timing for bi-directional input/output, said method comprising:
generating a tag;
sending said generated tag through a data path, wherein said data path extends within a memory core, wherein said data path crosses a clock domain boundary at least two times, and wherein said sending said generated tag further comprises sending said generated tag across said clock domain boundary at least two times;
determining path latency based on a data path travel time of said generated tag;
selecting with a multiplexer at least one pipeline stage from a plurality of pipeline stages; and
selectively adding path delay based upon the determined path latency by adding the at least one pipeline stage to said data path to adjust said path latency to a predictable time.

19. The method of claim 18 wherein the path latency is measured periodically.

20. The method of claim 18 wherein path latency is measured continuously.

21. The system of claim 1, wherein said memory core comprises a single-port memory core.

* * * * *